UNITED STATES PATENT OFFICE.

WILLIAM A. HALL, OF NEW YORK, N. Y., ASSIGNOR TO AMERICAN MAHOGANY COMPANY, A CORPORATION OF MAINE.

ART OF TREATING WOOD FOR LUMBER.

No. 924,770.            Specification of Letters Patent.        Patented June 15, 1909.

Application filed May 13, 1907, Serial No. 373,228.    Renewed November 20, 1908. Serial No. 463,716.

*To all whom it may concern:*

Be it known that I, WILLIAM A. HALL, a citizen of the United States, residing at New York, in the county of New York and State of New York, have invented or discovered certain new and useful Improvements in the Art of Treating Wood for Lumber, of which the following is a specification.

This invention has for its object to produce, from comparatively inexpensive woods, products closely resembling mahogany or other high-priced woods, both in appearance and texture. Attempts have heretofore been made to produce imitation mahogany and other high-priced woods from less expensive hard woods, but difficulties have been encountered in producing lumber which would have a uniform appearance throughout; and the expense of the dyes which have been employed for coloring the woods has been so great as to render the artificially colored lumber objectionably expensive.

In accordance with the present invention the low-priced woods may be artificially colored throughout by means of highly concentrated bark coloring matters, of great capillary activity, produced from what have heretofore been waste products. In the preferred procedure, in practicing the invention, the artificial coloring matter used is a solution comprising the phlobaphenes of hemlock bark, or "reds" as they are popularly or commonly termed, and which have been found, for most products, to be best adapted for the purpose; although when fixed browns are desired the phlobaphenes of oak are best. These phlobaphenes of hemlock or oak bark are comprised in the insoluble portions of hemlock or oak extracts made for tanning purposes, and are contained in an extract sediment, usually insoluble in water, which settles in the process of making the tanning extracts. To render this material adapted for the purpose above indicated it is dissolved in an alkali, producing a dark red solution, and is then preferably strained in order to remove any insoluble particles; there being small portions of these bark extract sediments which are insoluble, even in alkali, and which have a tendency to clog up the pores of the wood, preventing the soluble portions from effecting perfect penetration. Where very perfect penetration is necessary it is further desirable to permit these solutions, after straining, to settle; and then to decant or siphon off the thoroughly soluble portion,—the very fine, insoluble matter not straining out settling to the bottom of the tank. As this material has heretofore been considered a waste product the cost of this coloring solution is very little, so that the artificial coloring of lumber by this solution is attended by little expense.

In carrying the invention into effect the lumber, which may be of yellow birch or any other inexpensive wood, is first sawed into boards, planks, flitches or deals of any convenient size, and is then thoroughly dried, preferably by kiln-drying, so that any moisture which might oppose the entrance of the coloring matter is entirely removed. The dried lumber is then subjected, in a closed receptacle, to a vacuum, of preferably not less than 25 inches, and preferably in the presence of some heat; thus extracting the air from the dried lumber and rendering the same absorbent. The coloring liquid is then admitted into the closed receptacle while the vacuum is still on, and the absorption thereof by the lumber is aided by hydraulic or air pressure applied to the closed receptacle and preferably exceeding 250 pounds to the square inch, thereby thoroughly impregnating the lumber with the artificial, bark coloring matter. A high temperature of over 212° F. is preferably maintained during this pressure treatment, as such high temperature also assists in the coloring operation by a boiling or cooking of the wood in the hot alkaline solution.

The alkali solutions of the phlobaphenes of wood bark make, in combination with the wood into which they are infused, a new chemical composition, in that the alkali present in the said alkalized solutions combines, to a certain extent, with the lignin of the wood being treated, making it more readily receptive for the absorption of the coloring solutions. This produces a color in the wood different from any produced with dyes, as it is an absolutely natural wood color in appearance; and the process is vastly cheaper than any wood coloring process heretofore practiced with any of the well-known stains or dyes.

Somewhat different shades of the colored wood are obtained by the use of different alkalies in the phlobaphene solutions. Thus the use of carbonate of soda produces the brightest red, while sodium hydroxid gives a yellowish red, and ammonium hydroxid gives a brownish red. In the preparation of these alkalized phlobaphene bark solutions, for the purpose stated, an amount of alkali, over what is required to dissolve the wood bark extract, to make the solution, has been found to be desirable, if not absolutely necessary, in order to overcome the natural acidity of the wood.

Having thus described my invention I claim and desire to secure by Letters Patent:—

1. The herein described improvement in the art of treating wood for lumber, consisting in impregnating the wood with an alkalized phlobaphene solution.

2. The herein described improvement in the art of treating wood for lumber, consisting in impregnating the wood with an alkalized phlobaphene solution containing an excess of alkali over that necessary to dissolve the phlobaphene extract.

3. The herein described improvement in the art of treating wood for lumber, consisting in impregnating the wood with an alkalized solution of the phlobaphenes of hemlock bark.

4. The herein described improvement in the art of treating wood for lumber, consisting in impregnating the wood with an alkalized solution of the phlobaphenes of hemlock bark, and which solution contains an excess of alkali over that necessary to dissolve the phlobaphene extract.

5. The herein described improvement in the art of treating wood for lumber, consisting in dissolving bark phlobaphenes with an alkali, and then impregnating the wood with the phlobaphene solution.

6. The herein described improvement in the art of treating wood for lumber, consisting in first thoroughly drying the wood, then subjecting the dried wood to a vacuum process in a closed receptacle for the purpose of removing the air therefrom, and then forcing a coloring matter, consisting of an alkalized phlobaphene solution of bark, into the wood.

7. The herein described product consisting of wood containing throughout alkalized bark phlobaphenes, so that its entire structure is artificially colored by the said bark phlobaphenes.

8. The herein described product consisting of wood permeated throughout with alkalized phlobaphenes of hemlock bark, so that it is bodily colored throughout by the hemlock stain.

In testimony whereof I affix my signature, in presence of two witnesses.

WILLIAM A. HALL.

Witnesses:
 JOHN C. McCUSKER,
 C. M. SWEENEY.